United States Patent [19]

Raukauskas

[11] Patent Number: 5,720,513
[45] Date of Patent: Feb. 24, 1998

[54] VEHICLE SEAT WITH REMOVABLE TOILET

[76] Inventor: Richard Raukauskas, 9741 S. Cicero Ave., #1-A, Oaklawn, Ill. 60453

[21] Appl. No.: 586,203

[22] Filed: Jan. 16, 1996

[51] Int. Cl.[6] ................................................. A47K 11/04
[52] U.S. Cl. ........................... 297/188.1; 297/188.12; 297/217.1; 4/483
[58] Field of Search ....................... 297/188.1, 188.08, 297/188.09, 188.12, 217.1; 24/662, 697.1; 4/476, 478, 479, 483; 403/375

[56] References Cited

U.S. PATENT DOCUMENTS

| | | | |
|---|---|---|---|
| 357,914 | 2/1887 | Farson | 297/188.1 |
| 2,073,390 | 3/1937 | Giblette | 4/483 X |
| 2,779,390 | 1/1957 | Freeman | 297/440.1 |
| 3,164,054 | 1/1965 | Biesecher | 24/662 |
| 4,261,613 | 4/1981 | Alford | 4/483 X |
| 4,785,483 | 11/1988 | Wise | 4/483 X |
| 4,893,360 | 1/1990 | Wofford | 297/788.1 X |
| 5,363,516 | 11/1994 | Butts | 4/483 X |

FOREIGN PATENT DOCUMENTS 2382222  11/1978  France ........................... 4/483

*Primary Examiner*—Peter R. Brown

[57] ABSTRACT

A vehicle seat with removable toilet including a seat portion having an upper portion and a lower portion formed together to provide a seat. The lower portion has a pair of supports to raise the lower portion away from ground level. The lower portion has a central aperture formed therethrough. The lower portion has a seat cushion removably secured thereto. The seat cushion has a recessed lower surface disposed over the central aperture when in a closed configuration. A removable toilet is dimensioned for receipt within the central aperture of the lower portion of the seat portion. The open upper end has a rim portion extending around a peripheral edge thereof.

3 Claims, 3 Drawing Sheets

VEHICLE SEAT WITH REMOVABLE TOILET

BACKGROUND OF THE INVENTION

1. Field of the Invention

The present invention relates to a vehicle seat with removable toilet and more particularly pertains to combining a vehicle seat with a toilet to avoid making frequent restroom stops with a vehicle seat with removable toilet.

2. Description of the Prior Art

The use of portable toilets is known in the prior art. More specifically, portable toilets heretofore devised and utilized for the purpose of providing a place for one to relieve themselves are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,785,483 to Wise discloses an integrated passenger seat and toilet apparatus and method.

U.S. Pat. No. 4,944,048 to Sargent et al. discloses a self-contained RV sanitary system.

U.S. Pat. No. 4,215,445 to Antos et al. discloses a portable toilet.

U.S. Pat. No. 5,179,738 to Sowards discloses an R.V. toilet venting system.

U.S. Pat. No. 5,031,249 to Sargent discloses a universal recreational vehicle toilet system with removable holding tank.

U.S. Pat. No. 4,823,412 to Spiegel discloses a commode chair with pail and seat support.

While these devices fulfill their respective, particular objective and requirements, the aforementioned patents do not describe a vehicle seat with removable toilet for combining a vehicle seat with a toilet to avoid making frequent restroom stops.

In this respect, the vehicle seat with removable toilet according to the present invention substantially departs from the conventional concepts and designs of the prior art, and in doing so provides an apparatus primarily developed for the purpose of combining a vehicle seat with a toilet to avoid making frequent restroom stops.

Therefore, it can be appreciated that there exists a continuing need for new and improved vehicle seat with removable toilet which can be used for combining a vehicle seat with a toilet to avoid making frequent restroom stops. In this regard, the present invention substantially fulfills this need.

SUMMARY OF THE INVENTION

In the view of the foregoing disadvantages inherent in the known types of portable toilets now present in the prior art, the present invention provides an improved vehicle seat with removable toilet. As such, the general purpose of the present invention, which will be described subsequently in greater detail, is to provide a new and improved vehicle seat with removable toilet and method which has all the advantages of the prior art and none of the disadvantages.

To attain this, the present invention essentially comprises a seat portion having an upper portion and a lower portion formed together to provide a seat. The lower portion has a pair of supports to raise the lower portion away from ground level. The lower portion has a central aperture formed therethrough. The lower portion has a seat cushion hingedly secured to a side edge thereof. The seat cushion has a recessed lower surface disposed over the central aperture when in a closed configuration. The lower portion has four pins extending upwardly therefrom around an outer periphery of the central aperture. Each of the four pins have an enlarged upper end and an elongated lower portion. The device includes a removable toilet having a generally cylindrical configuration. The removable toilet has an open upper end, a closed lower end, and a surrounding side wall therebetween. The removable toilet is dimensioned for receipt within the central aperture of the lower portion of the seat portion. The open upper end has a rim portion extending around a peripheral edge thereof. The removable toilet has a circular flange integral therewith disposed below the rim portion thereof. The circular flange has four apertures formed therethrough. Each of the four apertures have a rubber grommet disposed therein. Each of the four apertures is positioned to frictionally receive the four pins of the lower portion of the seat portion therethrough.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle seat with removable toilet which has all the advantages of the prior art portable toilets and none of the disadvantages.

It is another object of the present invention to provide a new and improved vehicle seat with removable toilet which may be easily and efficiently manufactured and marketed.

It is a further object of the present invention to provide a new and improved vehicle seat with removable toilet which is of durable and reliable construction.

An even further object of the present invention is to provide a new and improved vehicle seat with removable toilet which is susceptible of a low cost of manufacture with regard to both materials and labor, and which accordingly is then susceptible of low prices of sale to the consuming public, thereby making such a vehicle seat with removable toilet economically available to the buying public.

Still yet another object of the present invention is to provide a new and improved vehicle seat with removable toilet which provides in the apparatuses and methods of the prior art some of the advantages thereof, while simultaneously overcoming some of the disadvantages normally associated therewith.

Even still another object of the present invention is to provide a new and improved vehicle seat with removable toilet for combining a vehicle seat with a toilet to avoid making frequent restroom stops.

Lastly, it is an object of the present invention to provide a new and improved vehicle seat with removable toilet including a seat portion having an upper portion and a lower portion formed together to provide a seat. The lower portion has a pair of supports to raise the lower portion away from ground level. The lower portion has a central aperture formed therethrough. The lower portion has a seat cushion removably secured thereto. The seat cushion has a recessed lower surface disposed over the central aperture when in a closed configuration. A removable toilet is dimensioned for receipt within the central aperture of the lower portion of the seat portion. The open upper end has a rim portion extending around a peripheral edge thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
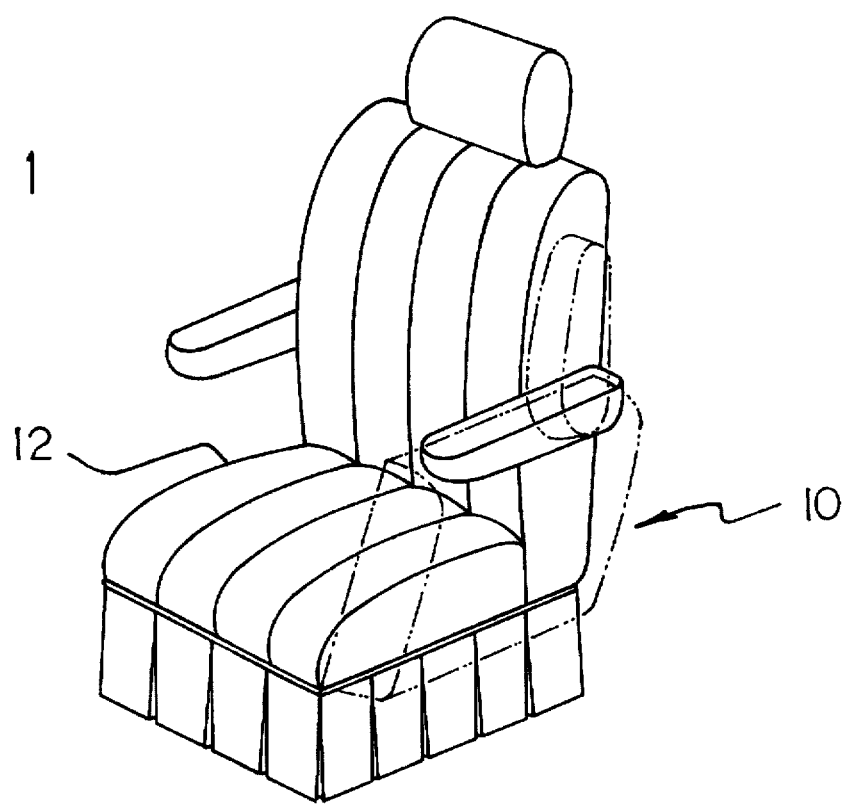
FIG. 1 is a perspective view of the preferred embodiment of the vehicle seat with removable toilet constructed in accordance with the principles of the present invention.
Figure 2:
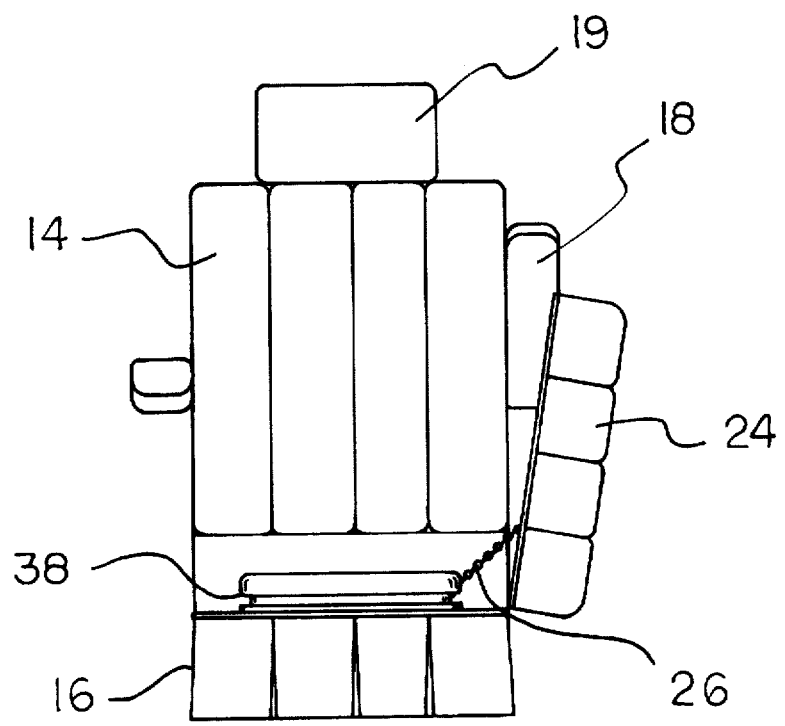
FIG. 2 is a front elevation view of the present invention.
Figure 3:
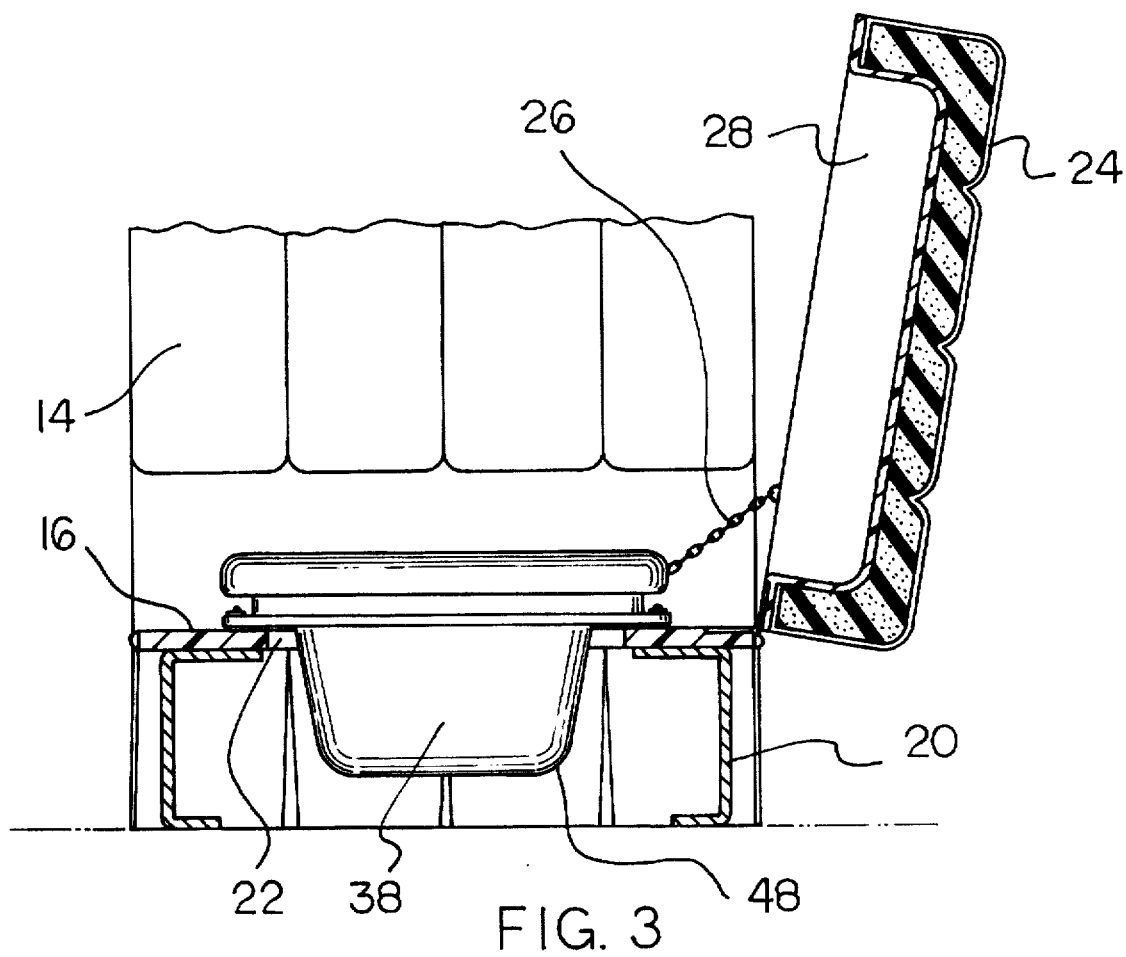
FIG. 3 is a side view of the present invention shown in cross-section.
Figure 4:
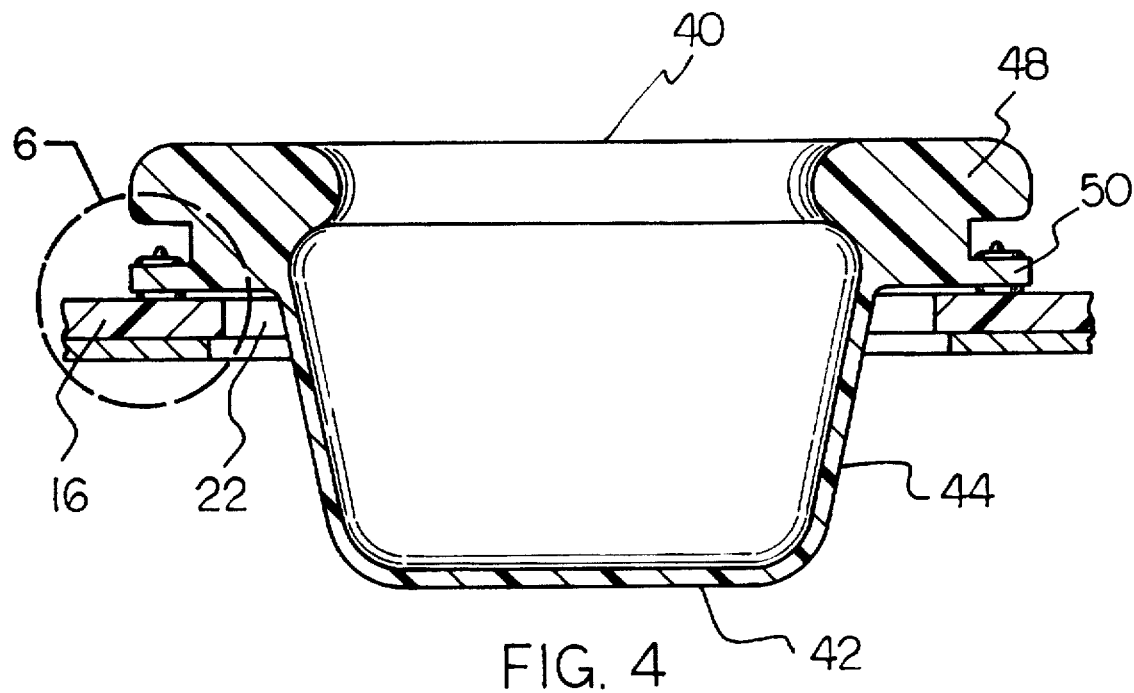
FIG. 4 is a cross-sectional view of the removable toilet seat of the present invention.
Figure 5:
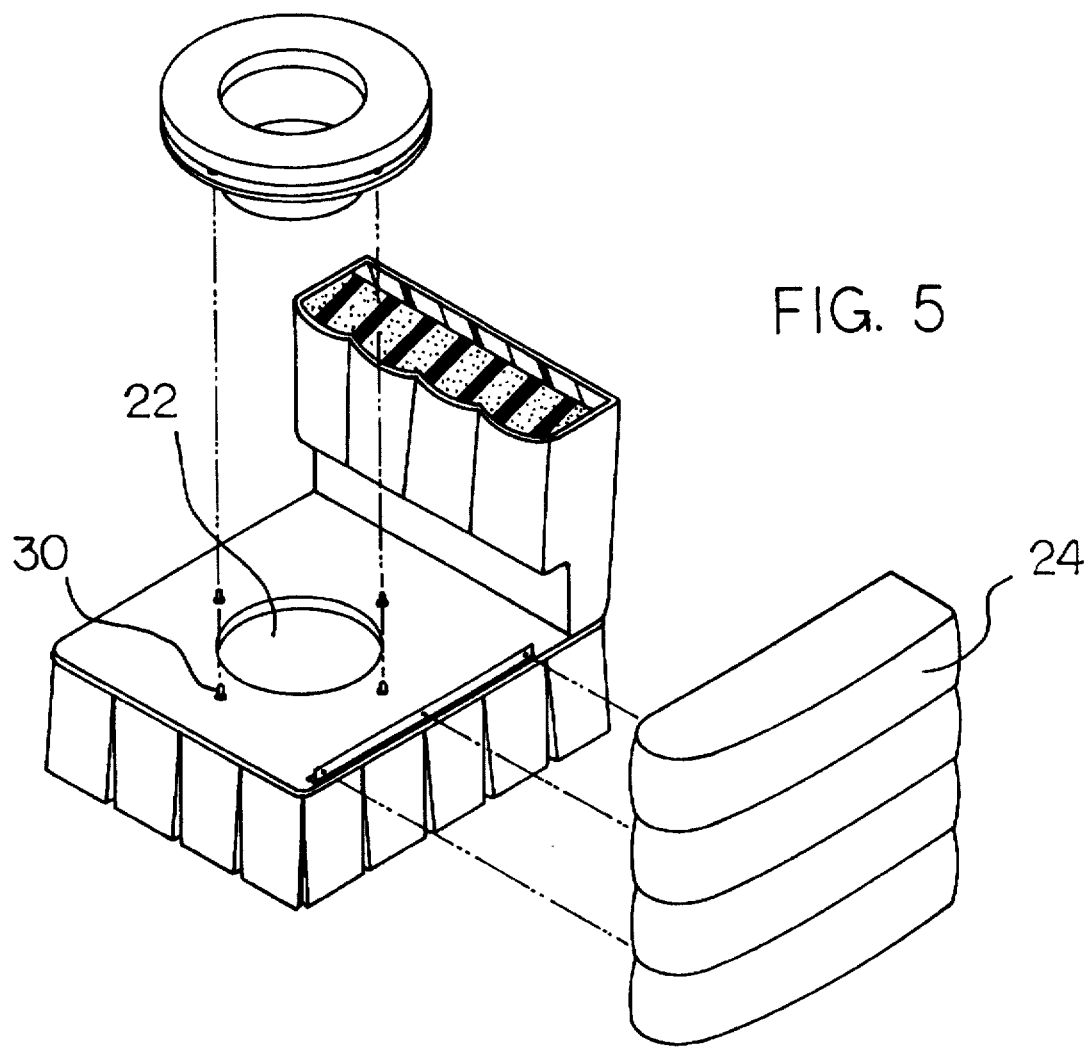
FIG. 5 is an exploded perspective view of the present invention.
Figure 6:
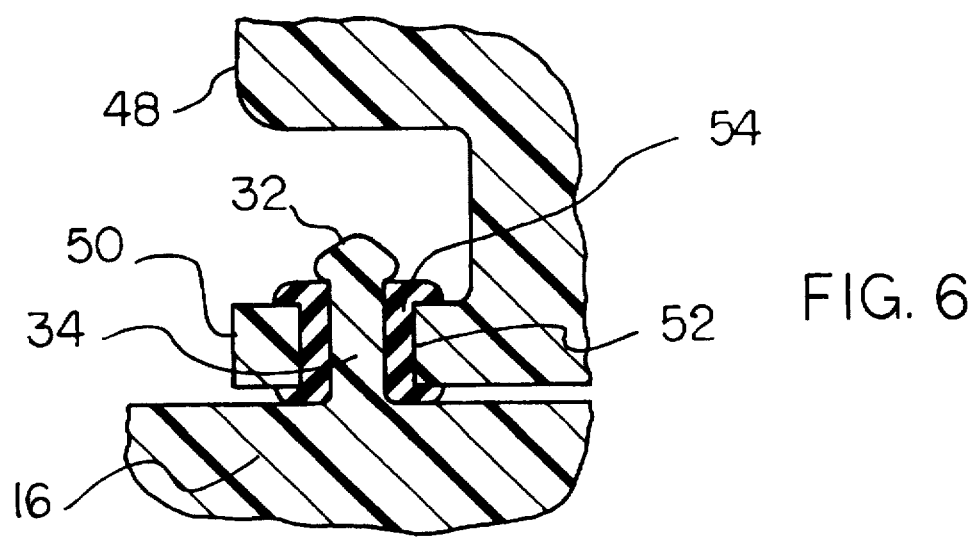
FIG. 6 is an enlarged front view of the coupling of the removable toilet seat to the seat portion.

With reference now to the drawings, and in particular, to FIGS. 1-6 thereof, the preferred embodiment of the new and improved vehicle seat with removable toilet embodying the principles and concepts of the present invention and generally designated by the reference number 10 will be described.

Specifically, it will be noted in the various Figures that the device relates to a new and improved vehicle seat with removable toilet for combining a vehicle seat with a toilet to avoid making frequent restroom stops. In its broadest context, the device consists of a seat portion and a removable toilet. Such components are individually configured and correlated with respect to each other so as to attain the desired objective.

The device 10 includes a seat portion 12 having an upper portion 14 and a lower portion 16 formed together to provide a seat. The upper portion 14 contains a pair of arm rests 18. The upper portion 14 is also equipped with a head rest 19. One of the arm rest 18 will pivot upwardly. The seat portion 12 is padded and designed in any number of ways to provide comfort to a user. The lower portion 16 has a pair of supports 20 to raise the lower portion 16 away from ground level. The pair of supports 20 will also allow the seat portion 12 to be secured within a vehicle. The lower portion 16 has a central aperture 22 formed therethrough. The central aperture 22 preferably takes up less than half of the area of the lower portion 16. The lower portion 16 has a seat cushion 24 hingedly secured to a side edge thereof. A small chain 26 is attached to a lower end of the seat cushion 24 and also to the lower portion 16 to prevent the seat cushion 24 extending beyond an orthogonal relationship to the lower portion 16. The seat cushion 24 has a recessed lower surface 28 disposed over the central aperture 22 when in a closed configuration. The seat cushion 24 is also properly padded in a similar fashion as the seat portion 12. The lower portion 16 has four pins 30 extending upwardly therefrom around an outer periphery of the central aperture 22. The four pins 30 are positioned at ninety degree intervals around the central aperture 22. Each of the four pins 30 have an enlarged upper end 32 and an elongated lower portion 34.

The device 10 also includes a removable toilet 38 having a generally cylindrical configuration. The removable toilet 38 has an open upper end 40, a closed lower end 42, and a surrounding side wall 44 therebetween. The removable toilet 38 is dimensioned for receipt within the central aperture 22 of the lower portion 16 of the seat portion 12. The open upper end 40 has a rim portion 48 extending around a peripheral edge thereof. The rim portion 48 extends slightly inwardly of the open upper end 40 to provide a place for a user to comfortably sit. The removable toilet 38 has a circular flange 50 integral therewith disposed below the rim portion 48 thereof. The circular flange 50 abuts the outer edge of the circular aperture 22 thereby preventing the removable toilet 38 from sliding further within the circular aperture 22. The circular flange 50 has four apertures 52 formed therethrough. The four apertures 52 are positioned at ninety degree intervals around the circular flange 50. Each of the four apertures 52 have a rubber grommet 54 disposed therein. Each of the four apertures 52 is positioned to frictionally receive the four pins 30 of the lower portion 16 of the seat portion 12 therethrough. The enlarged upper ends 32 of the four pins 30 require a user to apply downward pressure on the removable toilet 38 in order to secure the toilet 38 in place within the central aperture 22. Once a user feels the need to use the removable toilet 38, they raise the seat cushion 24 and position themselves upon the removable toilet 38. Once they are finished using the toilet 38, the toilet 38 can be removed to dispose of the waste or the seat cushion can be lowered until a place of disposal is reached. An optional sealing cover could be included with the device 10 to prevent any unwanted spillage.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A vehicle seat with removable toilet for combining a vehicle seat with a toilet to avoid making frequent restroom stops comprising, in combination:

a seat portion having an upper portion and a lower portion formed together to provide a seat, the lower portion having a pair of supports to raise the lower portion away from ground level, the lower portion having a central aperture formed therethrough, the lower portion having a seat cushion hingedly secured to a side edge thereof, the seat cushion having a recessed lower surface disposed over the central aperture when in a closed configuration, the lower portion having four pins extending upwardly therefrom around an outer periphery of the central aperture, each of the four pins having an enlarged upper end and an elongated lower portion;

a removable toilet having a generally cylindrical configuration, the removable toilet having an open upper end, a closed lower end, and a surrounding side wall therebetween, the removable toilet dimensioned for receipt within the central aperture of the lower portion of the seat portion, the open upper end having a rim portion extending around a peripheral edge thereof, the removable toilet having a circular flange integral therewith disposed below the rim portion thereof, the circular flange having four apertures formed therethrough, each of the four apertures having a rubber grommet disposed therein, each of the four apertures positioned to frictionally receive the four pins of the lower portion of the seat portion therethrough.

2. A vehicle seat with removable toilet apparatus comprising:

a vehicle seat portion having an upper portion and a lower portion formed together to provide a seat, the lower portion having a pair of supports to raise the lower potion away from round level, the lower portion having a central aperture formed therethrough, the lower portion having a seat cushion removably secured thereto, the seat cushion having a recessed lower surface disposed over the central aperture when in a closed configuration, the vehicle seat portion securable within a vehicle for use therein, the lower portion of the seat portion having four pins extending upwardly therefrom around an outer periphery of the central aperture, each of the four pins having an enlarged upper end and an elongated lower portion;

a removable toilet dimensioned for receipt within the central aperture of the lower portion of the vehicle seat portion, the open upper end having a rim portion extending around a peripheral edge thereof, the removable toilet having a circular flange integral therewith disposed below the rim portion thereof, the circular flange having four apertures formed therethrough, each of the four apertures having a rubber grommet disposed therein, each of the four apertures positioned to frictionally receive the four pins of the lower portion of the seat portion therethrough.

3. The apparatus as set forth in claim 2 wherein the seat cushion being hingedly secured to a side edge of the lower portion of the seat portion.

* * * * *